United States Patent
Nakajima et al.

(10) Patent No.: US 7,815,512 B2
(45) Date of Patent: Oct. 19, 2010

(54) THREAD FORMING TAP AND METHOD FOR MANUFACTURING THE SAME

(75) Inventors: Takayuki Nakajima, Toyokawa (JP); Kentarou Norimatsu, Toyokawa (JP)

(73) Assignee: OSG Corporation, Toyokawa (JP)

( * ) Notice: Subject to any disclaimer, the term of this patent is extended or adjusted under 35 U.S.C. 154(b) by 320 days.

(21) Appl. No.: 11/918,243

(22) PCT Filed: Apr. 27, 2005

(86) PCT No.: PCT/JP2005/008048
§ 371 (c)(1),
(2), (4) Date: Feb. 11, 2008

(87) PCT Pub. No.: WO2006/117850
PCT Pub. Date: Nov. 9, 2006

(65) Prior Publication Data
US 2008/0268967 A1    Oct. 30, 2008

(51) Int. Cl.
*B21J 13/02* (2006.01)
*B24B 1/00* (2006.01)
(52) U.S. Cl. .................... 470/204; 470/198; 451/48
(58) Field of Classification Search .................... 72/66, 72/84, 198, 199, 204; 408/222; 470/10; 76/102, 108.1, 117; 451/48
See application file for complete search history.

(56) References Cited
U.S. PATENT DOCUMENTS
2,991,491 A * 7/1961 Welles, Jr. ............... 470/204
3,390,410 A * 7/1968 Bridges ................... 470/204
3,656,197 A * 4/1972 Van Vleet ................. 470/84
3,775,792 A * 12/1973 Leonard ................... 470/204
6,217,267 B1 * 4/2001 Sugano et al. ............ 408/222
6,685,573 B2 * 2/2004 Hikosaka et al. .......... 470/204
2003/0078109 A1   4/2003 Hikosaka et al.

FOREIGN PATENT DOCUMENTS
JP    A 10-169748    6/1998
JP    A 10-296537    11/1998
JP    A 2003-127027    5/2003

* cited by examiner

*Primary Examiner*—Edward Tolan
(74) *Attorney, Agent, or Firm*—Oliff & Berridge, PLC

(57) ABSTRACT

A following margin of a following flank of an external thread is shifted more in a screw-rotation direction than a leading margin of a leading flank. Thus, during biting, the following margin bites first, thereby suppressing a force that pushes back a tap and reducing a tapping torque. Because margin portions can be disposed parallel to an axis of a thread forming tap, working is easy and manufacture can be performed inexpensively. When, in forming an external thread by grinding by a grinding abrasive, an inclination angle of the axis of a tap blank and an abrasive axis of the grinding abrasive is equal to a lead angle of the external thread, the margins are formed symmetrically across a root. On the other hand, if the inclination angle is made greater than the lead angle, the following margin can be shifted in the screw-rotation direction, enabling manufacture to be performed as easily and inexpensively as in a conventional case.

4 Claims, 4 Drawing Sheets

FRONT END SIDE OF TAP

FRONT END SIDE OF TAP

FIG.4

| TESTED TAP | TAPPING TORQUE (N·m) | | | | | |
|---|---|---|---|---|---|---|
| | 1ST HOLE | 2ND HOLE | 3RD HOLE | 4TH HOLE | 5TH HOLE | AVERAGE |
| CONVENTIONAL TAP | 0.36 | 0.35 | 0.33 | 0.34 | 0.36 | 0.35 |
| TAP OF COMPARATIVE EXAMPLE (−0.75W) | 0.41 | 0.40 | 0.39 | 0.42 | 0.39 | 0.40 |
| TAP OF PRESENT INVENTION (+0.75W) | 0.30 | 0.29 | 0.30 | 0.29 | 0.29 | 0.29 |

THREAD FORMING TAP AND METHOD FOR MANUFACTURING THE SAME

TECHNICAL FIELD

The present invention relates to a thread forming tap that forms an internal thread by plastically deforming a surface layer of a prepared hole, and relates in particular to an art of reducing a tapping torque.

BACKGROUND ART (a) There is known a thread forming tap that has a working portion provided with an external thread corresponding to an internal thread to be formed. On the external thread, a plurality of margin portions forming the internal thread, and a plurality of relief portions having a smaller diameter than the margin portions, are disposed so as to respectively extend in an axial direction in parallel to a tap axis and alternate around the tap axis. (b) By screwing the working portion into a prepared hole, the margin portions cuts into a surface layer of the prepared hole to form the internal thread to thereby plastically deform the surface layer.

In such a thread forming tap, due to a lead angle of the external thread, a leading margin $M_1$ disposed at a leading flank, is shifted in a screw-rotation direction in comparison to a following margin $M_2$ as shown for example in FIG. 2B. The following margin $M_2$ is disposed opposite to the leading margin $M_1$, relative to a crest.

Because when the thread forming tap bites into i.e., chamfer a worked body, the leading margin $M_1$ cuts into the surface layer of the prepared hole ahead of the following margin $M_2$, an action by which the thread forming tap is pushed back acts and a tapping torque is thereby increased. This is due, in a case of forming the external thread on the thread forming tap by grinding by a grinding abrasive, to inclining the grinding abrasive by just the same lead angle as the external thread. When an inclination angle of the grinding abrasive is the same as the lead angle of the external thread, the leading margin $M_1$ and the following margin $M_2$ become symmetrical shapes with respect to a root, and the leading margin $M_1$ leads the following margin $M_2$ by just the lead angle.

Meanwhile, in an art proposed in Patent Document 1, in order to reduce the tapping torque, margin portions are disposed so as to be inclined at the same angle as a lead angle of a thread in an opposite direction, and a following margin is made to lead around an axis. In FIG. 2B, the shaded portions show the margin portions M.

[Patent Document 1] Japanese Published Unexamined Patent Application No. 2003-127027

DISCLOSURE OF THE INVENTION

Subject to be Solved by the Invention

However, in order to dispose the margin portions inclingly as described in Patent Document 1, the working portion of the tap must itself be provided with a shape that is helical around the axis. Forming of the working portion was thus troublesome and made the manufacturing cost high.

The present invention has been made with the above circumstances as a background, and an object thereof is to reduce the tapping torque without inclining the margin portions with respect to the tap axis.

Means for Solving the Subject

For achieving the above object, a first aspect of the invention is featured by a thread forming tap for forming an internal thread, comprising (a) a working portion including a margin portion forming the internal thread to be formed, and a relief portion having a smaller diameter than the margin portion, having an external thread corresponding to the internal thread, the margin portion and the relief portion being disposed in plurality so as to be continuous in an axial direction in parallel to an axis and to be positioned alternately around the axis, (b) wherein by screwing the working portion into a prepared hole, the margin portions bites and plastically deforms a surface layer of the prepared hole to thereby form the internal thread, and (c) at least at a chamfer part, each of the margin portions has a following margin disposed at a following flank of a ridge of the external thread, and a leading margin disposed at a leading flank positioned oppositely across a root of the external thread, and the following margin is shifted more in a screw-rotation direction than a symmetry position of inversion of the leading margin onto the following flank with the root as a symmetry axis.

A second aspect of the invention is featured by a thread forming tap according to the first invention, a leading margin disposed at a leading flank of a ridge of the external thread, and a following margin disposed at a following flank positioned oppositely across a crest of the ridge, are positioned at the same position around the axis at the crest portion, or the following margin is shifted more in the screw-rotation direction than the leading margin.

A third aspect of the invention is featured by a thread forming tap according to the second invention, when a margin width, at the crest portion of each of the following margin and the leading margin is defined as W, the following margin is shifted in the screw-rotation direction by a predetermined amount in a range of (¼)W to W relative to the leading margin.

A fourth aspect of the invention is featured by a method for manufacturing a thread forming tap, (a) the thread forming tap comprising a working portion including a margin portion forming the internal thread to be formed, and a relief portion having a smaller diameter than the margin portion, having an external thread corresponding to the internal thread, the margin portion and the relief portion being disposed in plurality so as to be continuous in an axial direction in parallel to an axis and to be positioned alternately around the axis, (b) by screwing the working portion into a prepared hole, the margin portions biting and plastically deforming a surface layer of the prepared hole to thereby form the internal thread, the thread forming tap manufacturing method comprising the steps of: (c) making a grinding abrasive having an outer peripheral portion with a cross-sectional shape corresponding to a groove of the internal thread cut into an outer peripheral surface of a tap blank with rotating around an axis thereof, and move the tap blank in the axial direction with relatively rotating around an axis thereof in accordance with a lead of the internal thread; and making the grinding abrasive approach and separate relative to the tap blank in accordance with the margin portions and the relief portions to form the external thread by grinding; (d) wherein, in forming the external thread by grinding, the abrasive axis of the grinding abrasive is inclined more than a lead angle of the external thread with respect to the axis of the tap blank.

EFFECT OF THE INVENTION

In the thread forming tap according to the first aspect of the present invention, the following margin, disposed at the following flank is shifted more in the screw-rotation direction than the symmetry position of inversion of the leading margin onto the following flank with the root as the symmetry axis. The leading margin is disposed at the leading flank that is positioned opposite to the root of the external thread. Thus, for example, in comparison to the arrangement of FIG. 2B, the shift amount of the following margin and the leading margin is made small, or the following margin is shifted more in the screw-rotation direction than the leading margin. A force by which the leading margin pushes back the thread forming tap during biting of the thread forming tap into a worked body is thereby suppressed. Consequently, not only both the biting character and the propulsive character are improved, but the tapping torque is reduced.

The margin portions are sufficiently disposed so as to extend in parallel to the tap axis. The working portion is thereby made simple to form and inexpensive to manufacture, in comparison to the case where the working portion of the thread forming tap is made to have a twisted shape in itself. That is, it is easy to shift the following margin more in the screw-rotation direction than the symmetry position of inversion of the leading margin onto the following flank with the root of the external thread as the symmetry axis. For example, as in the fourth aspect of the present invention, the abrasive axis of the grinding abrasive for forming the external thread by grinding is simply inclined more with respect to the tap axis of the tap blank than the lead angle of the external thread. For this reason, manufacture can be performed as easily and inexpensively as in the conventional case.

In the second aspect of the present invention, the leading margin and the following margin that are disposed at respective sides across a crest of a ridge are positioned at the same position around the tap axis at the crest portion, or the following margin is shifted more in the screw-rotation direction than the leading margin. Thus, when the thread forming tap bites into a worked body, the leading margin and the following margin bite into the surface layer of the prepared hole simultaneously, or the following margin bites in first. Consequently, the force that pushes back the tap is suppressed further and the tapping torque is reduced further.

In the third aspect of the present invention, the shift amount in the screw-rotation direction of the following margin with respect to the leading margin is selected in the range of ($\frac{1}{4}$)W to W, relative to the margin width W. The following margin can thereby be shifted more in the screw-rotation direction than the leading margin to reduce the tapping torque while allowing manufacture, by the manufacturing method using the inclined abrasive according to the fourth aspect of the present invention, for example.

In the fourth aspect of the present invention, the abrasive axis of the grinding abrasive for forming the external thread by grinding is inclined more with respect to the tap axis of the tap blank than the lead angle of the external thread. Thus, as with the thread forming tap according to the first aspect of the present invention, the following margin is shifted more in the screw-rotation direction than the symmetry position of inversion of the leading margin onto the following flank with the root of the external thread as the symmetry axis. Consequently, the same effects as those of the first aspect of the invention are provided, and the thread forming tap can be manufactured as easily and inexpensively as in the conventional case.

BRIEF DESCRIPTION OF THE DRAWINGS

FIG. 4 is a table of results of examining tapping torques of the thread forming tap according to the present invention and the conventional thread forming tap.

DESCRIPTION OF SYMBOLS

Figure 1A:
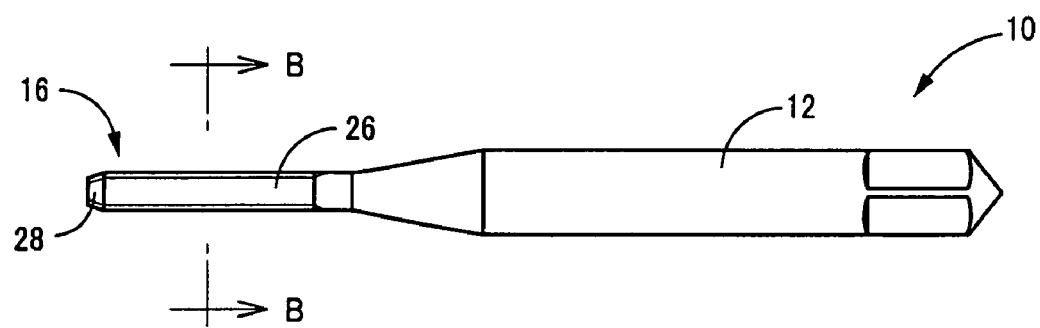
FIG. 1 shows diagrams for describing a thread forming tap that is an embodiment according to the present invention, with FIG. 1A being a front view and FIG. 1B being an enlarged view of a section taken on line B-B of FIG. 1A.

10: thread forming tap 12: shank 16: working portion 22: external thread 22a: leading flank 22b: following flank 24: relief portion 26: full thread part 28: chamfer part 30: tap blank 32: grinding abrasive M: margin portion $M_1$: leading margin $M_2$: following margin O: tap axis S: abrasive axis θ: inclination angle

BEST MODE FOR CARRYING OUT THE INVENTION

With the thread forming tap according to the present invention, the margin portion(s) of at least the chamfer part meets the requirements of the first to third aspects of the present invention. The full thread part may be the same as the conventional arrangement shown in FIG. 2B, or may be arranged in the same manner as the chamfer part. In applying the fourth aspect of the present invention to manufacture the thread forming tap, because the grinding abrasive is inclined more than the lead angle of the external thread, the shape of the outer peripheral portion is set in consideration of interference grinding. In this case, the external thread is preferably formed with the grinding abrasive being more inclined than the lead angle without distinguishing between the chamfer part and the full thread part.

A plurality of the margin portions that form the internal thread are disposed around the axis of the thread forming tap, and the margin portions are preferably disposed at three or more locations at equiangular intervals. The radial dimension of each margin portion is, for example, set to the same dimension as the internal thread to be formed. However, the dimension of the margin portion may be set slightly larger than the dimension of the internal thread, in consideration of elastic return with respect to plastic deformation of the internal thread.

In manufacturing the thread forming tap according to the present invention, for example, a tap blank having a polygonal prism shape of the same outer peripheral shape as the crests of the ridges of the external thread having the margin portions and the relief portions, is prepared. The external thread is preferably formed by grinding using a grinding abrasive on the tap blank as in the fourth aspect of the present invention. The thread forming tap may also be manufactured by grinding or rolling using a three-dimensional machine tool, etc.

With the fourth aspect of the present invention, the inclination angle formed by the abrasive axis of the grinding abrasive, and the tap axis of the tap blank, is made greater than the lead angle of the external thread. However, the difference (increase amount) between the inclination angle and the lead angle is set appropriately according to the shift amount by which the following margin is shifted in the screw-rotation direction. Because an excessive increase amount causing interference grinding is not preferable, the increase amount is preferably no more than approximately 20% of the lead angle.

EMBODIMENT

An embodiment of the present invention shall now be described in detail with reference to the drawings.

Figure 1B:
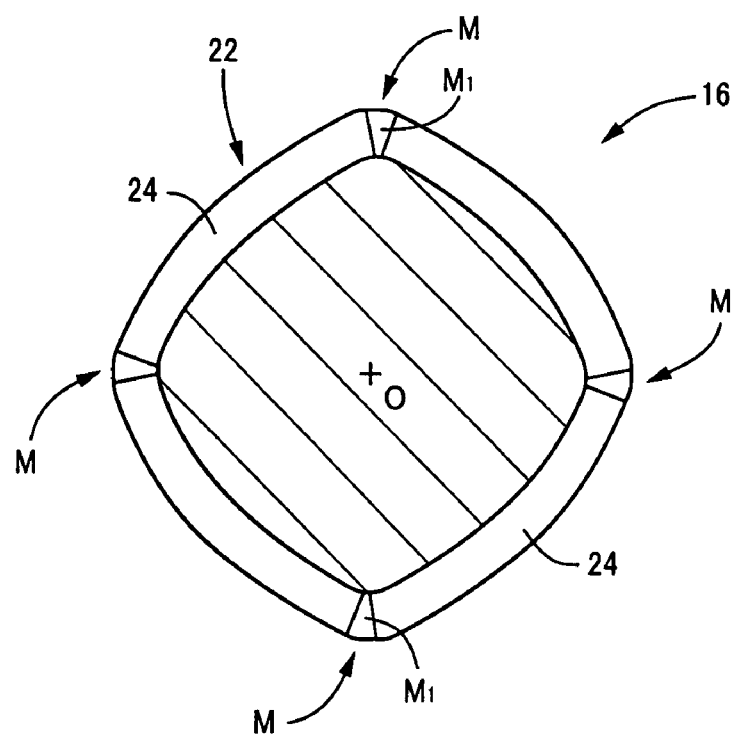

FIG. 1 shows a thread forming tap 10, which is an embodiment according to the present invention, with FIG. 1A being a front view as viewed in a direction perpendicular to a tap axis O, and FIG. 1B being an enlarged view of a section taken on line B-B of FIG. 1A. The thread forming tap 10 has a shank 12 and a working portion 16 that are coaxial and integral. The shank 12 is attached via a chuck (not shown) to a spindle. The working portion 16 forms an internal thread by being screwed into a prepared hole in a worked body. The thread forming tap 10 is formed of cemented carbide or other tool material, and a surface thereof is coated with a single layer or multiple layers of a hard film, formed of TiAlN, TiCN, TiN, etc.

The working portion 16 has a cross section with a polygonal prism shape, a substantially quadrangular prism shape in the present embodiment, with outwardly curving sides. On an outer peripheral surface of the working portion 16 is disposed an external thread 22 that bites into i.e., chamfers a surface layer of the prepared hole in the worked body and plastically deforms the surface layer to form the internal thread. The external thread 22 includes a plurality of ridges and a plurality of roots (grooves). Each ridge has a cross-sectional shape corresponding to the shape of a groove of the internal thread to be formed, and is formed to a fixed height dimension along a helical line with a lead angle corresponding to the internal thread.

That is, each ridge of the helical external thread 22 is provided with four margin portions M which protrude outward in the radial direction to form the internal thread, and four relief portions 24, which are smaller in diameter than the margin portions M. The margin portions M are positioned at corners of a quadrangle. The plurality of margin portions M and the plurality of relief portions 24 are disposed so as to respectively extend in an axial direction in parallel to the tap axis O and alternate at equiangular intervals around the tap axis O. The dimension of each margin portion M is set to the same dimension as the internal thread to be formed, or is set slightly larger than the internal thread in consideration of elastic return with respect to plastic deformation.

The working portion 16 has a full thread part 26, in which the radial dimension of the ridges is fixed, and a chamfer part 28, with which the radial dimension decreases toward a front end, and these parts being made continuous in the axial direction. FIG. 1B is a sectional view of a section taken along a helical line at a root bottom of a groove of the external thread 22.

Figure 2A:
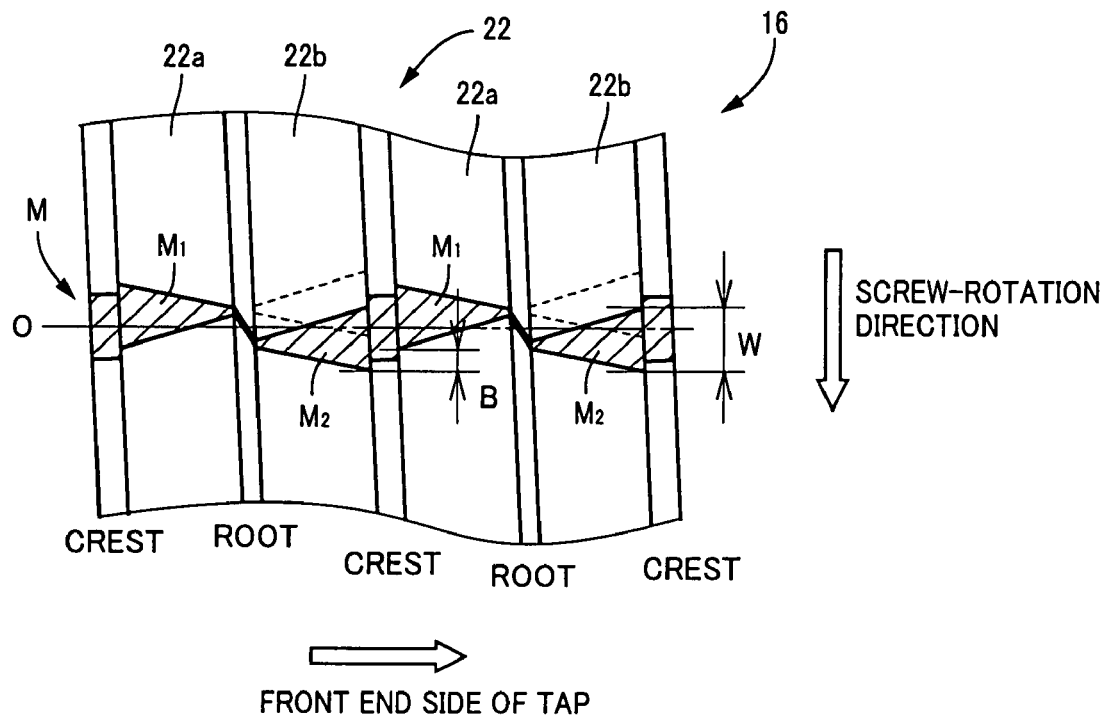
FIG. 2 shows developments of outer peripheral portions for describing margin portions, with FIG. 2A being a development of the thread forming tap according to the present invention and FIG. 2B being a development of a conventional thread forming tap.

FIG. 2A is a development, in which the working portion 16 is developed around the tap axis O in order to describe the margin portions M. A following margin $M_2$ is disposed at a following flank 22b of each ridge of the external thread 22, and at a leading flank 22a positioned oppositely across, that is opposite to a root of the external thread 22 is disposed a leading margin $M_1$. The following margin $M_2$ is shifted more in a screw-rotation direction than a symmetry position (indicated by broken lines in FIG. 2A) of inversion of the leading margin $M_1$ onto the following flank 22b with the root as the symmetry axis, that is with respect to the root. In the present embodiment, the following margin $M_2$ is shifted more in the screw-rotation direction than the leading margin $M_1$, and when a margin width at a crest portion is defined as W, a shift amount B at the crest portion is in a range of ($\frac{1}{4}$)W to W.

Figure 3A:
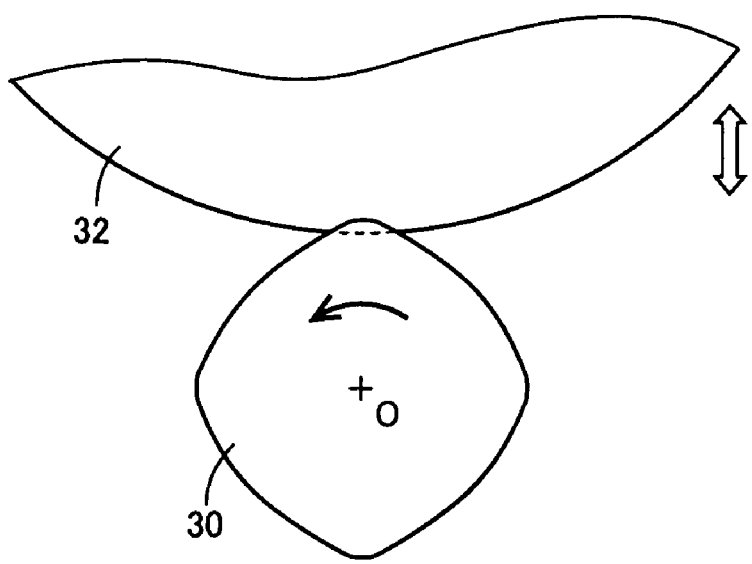
FIG. 3 shows diagrams for describing a method for manufacturing the thread forming tap of FIG. 1, with FIG. 3A being a front view as viewed from an axial direction of a tap blank and FIG. 3B being plan view.
Figure 3B:
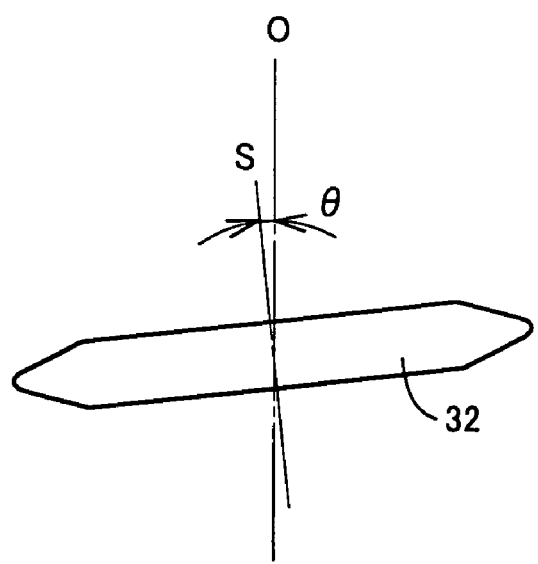

The forming i.e., working of the external thread 22 with such margin portions M and relief portions 24 shall now be described. As shown in FIG. 3, a tap blank 30 is prepared which is a polygonal prism shape with the same outer peripheral shape as the crests of the ridges of the external thread 22, and which has the margin portions M and the relief portions 24 of the thread forming tap 10. A grinding abrasive 32, having an outer peripheral portion with a cross-sectional shape that corresponds to the grooves of the internal thread to be formed, is used to work on the tap blank 30.

That is, the grinding abrasive 32 is rotatingly driven around an abrasive axis S and made to cut into i.e., chamfer the outer peripheral surface of the tap blank 30. In accordance with a lead of the internal thread, the tap blank 30 is moved in the axial direction while being rotated around the tap axis relative to the grinding abrasive 32. In this process, the grinding abrasive 32 is made to approach and separate relative to the tap blank 30 in accordance with the uneven shape (convex and concave) of the margin portions M and the relief portions 26, that is, in accordance with the outer peripheral shape of the tap blank 30. The external thread 22 is thus formed by grinding on the tap blank 30.

Figure 2B:
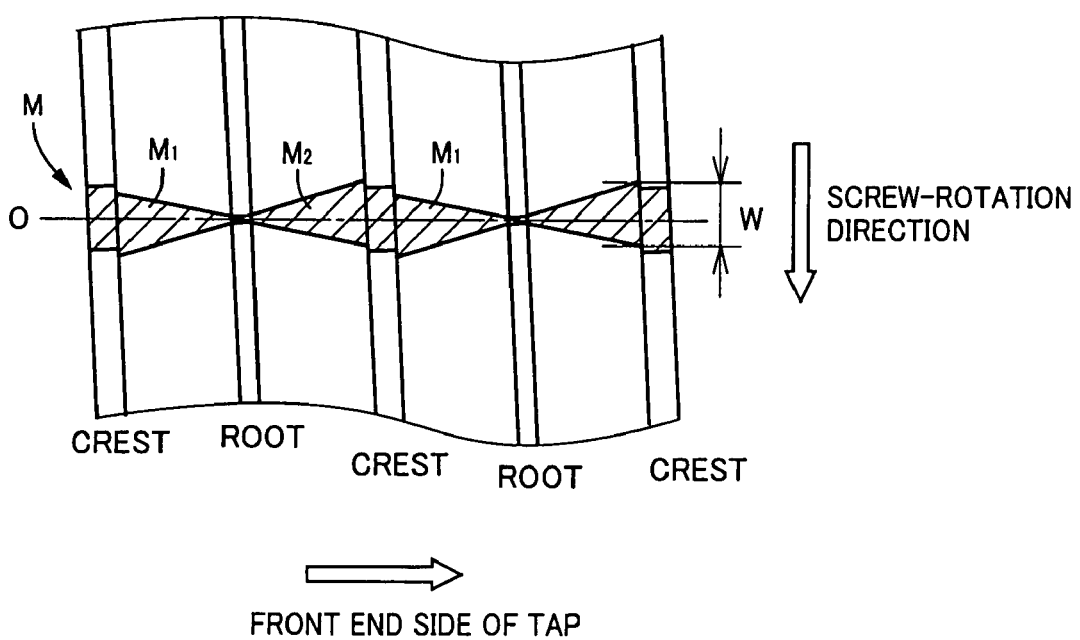

Here, when an inclination angle $\theta$ of the abrasive axis S of the grinding abrasive 32 with respect to the tap axis O of the tap blank 30 is made equal to a lead angle $\beta$ of the external thread, the leading margin $M_1$ and the following margin $M_2$ become symmetrical shapes with the root as the symmetry axis as shown in FIG. 2B. In contrast, with the present embodiment, the inclination angle $\theta$ of the abrasive axis S of the grinding abrasive 32 with respect to the tap axis O of the tap blank 30 is made greater than the lead angle $\beta$ of the external thread. This intends to shift the following margin $M_2$ in the screw-rotation direction relative to the leading margin $M_1$.

When the inclination angle $\theta$ is made greater than the lead angle $\beta$ as in the present embodiment, due to interference grinding, the grinding center at the following flank 22b side becomes shifted in the screw-rotation direction relative to the grinding center at the leading flank 22a side. As a result, the following margin $M_2$ shifts in the screw-rotation direction relative to the leading margin $M_1$.

For example, in a case of the thread forming tap 10 with nominal dimensions of M2×0.4, the lead angle $\beta$ of the external thread 22 is set to 4° 11' and the inclination angle $\theta$ is set to 4° 40'. Then in comparison to the case where $\theta=\beta$, that is, $\theta=4°$ 11', the following margin $M_2$ becomes shifted relatively by 0.0375 mm in the screw-rotation direction. If the margin width W at the crest portion of the external thread 22 is 0.05 mm, the following margin $M_2$ is shifted by just approximately 0.75 W.

When the inclination angle $\theta$ is made greater than the lead angle $\beta$, because the groove shape changes from the cross-sectional shape of the abrasive due to interference grinding, the cross-sectional shape of the outer peripheral portion of the abrasive is set in consideration of the interference grinding. With the present embodiment, in all regions from the chamfer part 28 to the full thread part 26, the external thread 22 is formed by grinding with the grinding abrasive 32 being kept inclined more than the lead angle β. The front end of the tap blank 30 is made gradually smaller in diameter in correspondence to the chamfer part 28 of the thread forming tap 10. The grinding abrasive 32 is made to approach and separate in accordance with the radial dimension variation of the tap blank 30, and ridges of the same height are formed at the small-diameter chamfer part 28 as well.

Although the positions of the following margin $M_2$ and the leading margin $M_1$ may vary slightly around the tap axis O, with the present embodiment, the plurality of margin portions M are disposed to extend in the axial direction in parallel to the tap axis O on the basis of the margin position at the root between the two types of margins. In the present embodiment, the margin width W at the crest portion (strictly speaking, the boundary with the crest) of the following margin $M_2$ and the leading margin $M_1$ and the margin width at the crest are substantially equal, and these are stepwise shifted. However, a crest margin may be provided at just the portion of overlap of the following margin $M_2$ and the leading margin $M_1$. The margin portions M may be changed in other ways as suitable.

In working on a prepared hole in a worked body, the working portion 16 of the thread forming tap 10 is screwed from the chamfer part 28 side into the prepared hole with substantially the same inner diameter dimension as the effective diameter of the internal thread. The margin portions M accordingly bite into the surface layer of the prepared hole, to thereby plastically deform the surface layer for forming the internal thread.

With the present embodiment, the following margin $M_2$, disposed at the following flank 22b, is shifted more in the screw-rotation direction than the symmetry position of the leading margin $M_1$, disposed at the leading flank 22a positioned opposite to the root of the external thread 22. The symmetry position of the leading margin $M_1$ is the position at which the leading margin $M_1$ is inverted onto the following flank 22b with the root of the external thread 22 as the symmetry axis.

The force by which the leading margin $M_1$ pushes back the thread forming tap 10, when the thread forming tap 10 bites into a worked body is suppressed, so that the biting character and the propulsive character are improved, and the tapping torque is reduced. In particular, in the biting process, the following margin $M_2$ shifted more in the screw-rotation direction than the leading margin $M_1$ first bites, and the force that pushes back the tap is suppressed further. Consequently, the tapping torque is further reduced.

Thus, the force that pushes back the thread forming tap 10 in the biting process is suppressed and the biting character and the propulsive character are improved. Consequently, the forming of burrs on the mouth of the internal thread is suppressed, and the durability of the thread forming tap 10 is improved.

Meanwhile, the margin portions M sufficiently are disposed so as to extend in parallel to the tap axis O of the thread forming tap 10. Thus, in comparison to the case where the working portion 16 of the thread forming tap 10 is made to have a twisted shape in itself as in Patent Document 1, the working portion 16 can be manufactured easily and inexpensively. That is, with the present embodiment, upon forming process the external thread 22 by grinding by the grinding abrasive 32, the inclination angle θ between the tap axis O of the tap blank 30 and the abrasive axis S of the grinding abrasive 32 is sufficiently made greater than the lead angle β of the external thread. The working portion 16 can thus be manufactured as easily and inexpensively as in the conventional case.

In the present embodiment, the shift amount B of the following margin $M_2$ in the screw-rotation direction with respect to the leading margin $M_1$ is set, in the range of (¼)W to W, with respect to the margin width W. The working portion 16 can thus be manufactured with the abrasive 32 in an inclined state as shown in FIG. 3, and by shifting the following margin $M_2$ more in the screw-rotation direction than the leading margin $M_1$, the tapping torque can be reduced.

For the thread forming tap of nominal dimensions M2×0.4, tapping under the working conditions described below was performed using the conventional thread forming tap (prior-art thread forming tap), shown in FIG. 2B, a comparative thread forming tap, and a thread forming tap according to the present invention. The results are shown in the table of FIG. 4. In the comparative thread forming tap, the following margin $M_2$ is retreated in the direction opposite the screw-rotation direction by just 75% of the margin width W in comparison to the conventional thread forming tap.

In the thread forming tap according to the present invention, the following margin $M_2$ is advanced in the screw-rotation direction by just 75% of the margin width W in comparison to the conventional thread forming tap. As a result of measuring the tapping torques of the conventional thread forming tap, the comparative thread forming tap, and the thread forming tap according to the present invention, it was found that the thread forming tap according to the present invention can reduce the tapping torque by no less than 15% in comparison to the conventional thread forming tap.

The external thread 22 was formed by grinding with the inclination angle θ=β=4' 11' in the conventional thread forming tap, and with the inclination angle θ being set to 3° 45', which is smaller than that of the conventional thread forming tap, in the comparative thread forming tap. It was formed with the inclination angle θ being set to 4° 40', which is greater than that of the conventional thread forming tap, in the thread forming tap according to the present invention. The margin width W is 0.05 mm, and the shift amount of the following margin $M_2$ relative to the conventional thread forming tap, is 0.0375 mm. The shift amount B in the screw-rotation direction of the following margin $M_2$ of the thread forming tap according to the present invention relative to the leading margin $M_1$ is approximately 0.025 mm (=0.5 W).

(Tapping Conditions)
    Tapped material: SUS304
    Machine used: vertical machining center
    Tapping speed: 10 m/min
    Tapping oil: chlorine-free, non-water-soluble tapping oil
    Shape of prepared hole: through hole, 6 mm
    Diameter of prepared hole: φ1.81 to φ1.83

An embodiment of the present invention was described in detail based on the drawings above. Noted is that this is no more than the illustration. The present invention can be put into practice in embodiments, in which various changes and modifications are applied based on the knowledge of those skilled in the art.

INDUSTRIAL APPLICABILITY

With the thread forming tap according to the present invention, the working portion is screwed into a prepared hole from the chamfer part side, and the margin portions bite into the surface layer of the prepared hole to plastically deform the surface layer, thereby forming an internal thread. The force that pushes back the thread forming tap in the biting process is thereby suppressed, the biting character and the propulsive character are improved, and the tapping torque is reduced. The thread forming tap according to the present invention can thus be used favorably in the forming of various internal threads.

The invention claimed is:

1. A thread forming tap for forming an internal thread, comprising:
   a working portion including a margin portion forming the internal thread to be formed, and a relief portion having a smaller diameter than the margin portion, having an external thread corresponding to the internal thread, the margin portion and the relief portion being disposed in plurality so as to be continuous in an axial direction in parallel to an axis and to be positioned alternately around the axis,
   wherein by screwing the working portion into a prepared hole, the margin portions bites and plastically deforms a surface layer of the prepared hole to thereby form the internal thread, and
   at least at a chamfer part, each of the margin portions has a following margin disposed at a following flank of a ridge of the external thread, and a leading margin disposed at a leading flank positioned oppositely across a root of the external thread, and the following margin is shifted more in a screw-rotation direction than a symmetry position of inversion of the leading margin onto the following flank with the root as a symmetry axis.

2. The thread forming tap according to claim 1, wherein the leading margin disposed at the leading flank of a ridge of the external thread, and the following margin disposed at the following flank positioned oppositely across a crest of the ridge, are positioned at the same position around the axis at the crest portion, or the following margin is shifted more in the screw-rotation direction than the leading margin.

3. The thread forming tap according to claim 2, wherein when a margin width, at the crest portion of each of the following margin and the leading margin is defined as W, the following margin is shifted in the screw-rotation direction by a predetermined amount in a range of ($\frac{1}{4}$)W to W relative to the leading margin.

4. A method for manufacturing a thread forming tap,
   the thread forming tap comprising a working portion including a margin portion forming the internal thread to be formed, and a relief portion having a smaller diameter than the margin portion, having an external thread corresponding to the internal thread, the margin portion and the relief portion being disposed in plurality so as to be continuous in an axial direction in parallel to an axis and to be positioned alternately around the axis, by screwing the working portion into a prepared hole, the margin portions biting and plastically deforming a surface layer of the prepared hole to thereby form the internal thread,
   the thread forming tap manufacturing method comprising steps of:
   making a grinding abrasive having an outer peripheral portion with a cross-sectional shape corresponding to a groove of the internal thread cut into an outer peripheral surface of a tap blank with rotating around an axis thereof, and move the tap blank in the axial direction with relatively rotating around an axis thereof in accordance with a lead of the internal thread; and
   making the grinding abrasive approach and separate relative to the tap blank in accordance with the margin portions and the relief portions to form the external thread by grinding,
   wherein, in forming the external thread by grinding, the abrasive axis of the grinding abrasive is inclined more than a lead angle of the external thread with respect to the axis of the tap blank.

* * * * *